United States Patent
Johnson (10) Patent No.: US 10,003,482 B2
(45) Date of Patent: Jun. 19, 2018

(54) RECEIVER ARCHITECTURE HAVING FULL-BAND CAPTURE AND NARROW-BAND PATHS

(71) Applicant: Silicon Laboratories Inc., Austin, TX (US)

(72) Inventor: Michael Stephen Johnson, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days. days.

(21) Appl. No.: 15/252,394

(22) Filed: Aug. 31, 2016

(65) Prior Publication Data
US 2018/0062888 A1 Mar. 1, 2018

(51) Int. Cl.
| H04L 27/06 | (2006.01) |
| H04B 1/66 | (2006.01) |
| H04L 27/00 | (2006.01) |
| H04L 12/26 | (2006.01) |
| H04B 1/00 | (2006.01) |

(52) U.S. Cl.
CPC ....... H04L 27/0002 (2013.01); H04B 1/0089 (2013.01); H04B 1/0092 (2013.01); H04L 43/028 (2013.01)

(58) Field of Classification Search
USPC ....... 375/219, 220, 222, 240, 256, 259, 295, 375/316, 324, 326, 340, 346, 347, 354, 375/356
See application file for complete search history.

(56) References Cited

U.S. PATENT DOCUMENTS

| 7,167,694 B2 | 1/2007 | Khoini-Poorfard et al. |
| 7,447,491 B2 | 11/2008 | Khoini-Poorfard |
| 7,869,528 B2 * | 1/2011 | Robinson ............. H04B 1/0483 375/146 |
| 8,238,479 B2 * | 8/2012 | Jung ........................ H03J 7/04 329/311 |
| 8,254,862 B2 | 8/2012 | Kasha et al. |
| 8,644,427 B2 * | 2/2014 | Porret .................... H04B 1/006 370/204 |
| 9,565,464 B2 * | 2/2017 | Anandakumar ......... H04N 5/44 |

(Continued)

OTHER PUBLICATIONS

U.S. Appl. No. 15/086,248, filed Mar. 31, 2016, entitled "Fully Flexible Multi-Tuner Front End Architecture for a Receiver," by Russell Croman, et al.

(Continued)

Primary Examiner — Linda Wong
(74) Attorney, Agent, or Firm — Trop, Pruner & Hu, P.C.

(57) ABSTRACT

In an embodiment, an apparatus includes: a first receiver to receive and downconvert a first radio frequency (RF) signal to a second frequency signal and to output a first digitized signal, the first receiver comprising a full-band receiver to receive at least a substantial portion of a band of interest; a second receiver to receive and downconvert a second RF signal to a third frequency signal and to output a second digitized signal, the second receiver comprising a narrow-band receiver to receive a first channel of the band of interest; a digital circuit to process at least one of the first and second digitized signals; and a controller to configure the first receiver and the second receiver and control the digital circuit.

20 Claims, 5 Drawing Sheets

(56) References Cited

U.S. PATENT DOCUMENTS

| | | | |
|---|---|---|---|
| 2004/0102172 A1* | 5/2004 | Hendin | H04B 1/005 455/302 |
| 2005/0253663 A1 | 11/2005 | Gomez et al. | |
| 2007/0110198 A1* | 5/2007 | Skarby | H04B 1/1027 375/349 |
| 2010/0195771 A1* | 8/2010 | Takahashi | H04L 27/14 375/324 |
| 2012/0224617 A1* | 9/2012 | Feher | H04M 3/382 375/222 |
| 2013/0010847 A1* | 1/2013 | Bagchi | H03G 3/3068 375/219 |
| 2013/0101012 A1 | 4/2013 | Toosi et al. | |
| 2013/0114588 A1* | 5/2013 | Kyperountas | H04B 1/0064 370/345 |
| 2014/0169502 A1* | 6/2014 | Lovell | H04L 5/0007 375/324 |
| 2016/0043748 A1* | 2/2016 | Brisebois | H04B 7/0626 455/230 |
| 2016/0127165 A1* | 5/2016 | Feher | H04W 64/00 375/130 |
| 2016/0127991 A1* | 5/2016 | Ang | H04W 52/0206 455/522 |
| 2016/0135061 A1* | 5/2016 | Abdelmonem | H04L 5/0026 455/422.1 |
| 2016/0373161 A1* | 12/2016 | Yun | H04W 72/085 |
| 2017/0040947 A1* | 2/2017 | Chang | H04B 1/006 |

OTHER PUBLICATIONS

Texas Instruments, "Dual VCO/PLL Synthesizer With IF Down-Conversion," Apr. 2005—Revised Dec. 2005, 31 pages.

Kyle Slightom, "Dual-Loop Clock Generator Cleans Jitter, Provides Multiple High-Frequency Outputs," Jan. 2014, 4 pages.

Silicon Labs, "High-Performance Automotive AM/FM Radio Receiver and HD Radio/DAB/DAB+/DMB/DRM Tuner," Mar. 12, 2015, 3 pages.

Silicon Labs, "High-Performance Automotive AM/FM Radio Receiver and HD Radio/DAB/DAB+/DMB/DRM Tuner with Audio System," Mar. 12, 2015, 3 pages.

* cited by examiner

RECEIVER ARCHITECTURE HAVING FULL-BAND CAPTURE AND NARROW-BAND PATHS

BACKGROUND

Many different types of receiver architectures are known. Some receivers implement a full-band capture receiver in which receiver circuitry is implemented having a bandwidth that is wide enough to process a whole band or a large portion of the band. While this arrangement necessarily includes a channel of interest, such architectures suffer from higher power consumption and higher interference, given that blocker channels also may be present in the received signal.

Other receiver arrangements are implemented with a narrow-band receiver in which components are configured to receive only a single channel of information. While such receivers have lower power consumption, there are drawbacks to such architectures in that information of channels outside the single received channel cannot be obtained.

SUMMARY OF THE INVENTION

In one aspect, an apparatus includes: a first receiver to receive and downconvert a first radio frequency (RF) signal to a second frequency signal and to output a first digitized signal, the first receiver comprising a full-band receiver to receive at least a substantial portion of a band of interest; a second receiver to receive and downconvert a second RF signal to a third frequency signal and to output a second digitized signal, the second receiver comprising a narrow-band receiver to receive a first channel of the band of interest; a digital circuit coupled to the first receiver and the second receiver to process at least the second digitized signal; and a controller to configure the first receiver and the second receiver and control the digital circuit.

In an implementation, the apparatus further comprises a third receiver to receive and downconvert a third RF signal to a fourth frequency signal and to output a third digitized signal, the third receiver comprising a narrow-band receiver to receive a second channel of the band of interest. The apparatus may further include: a fourth receiver to receive and downconvert a fourth RF signal to a fifth frequency signal and to output a fourth digitized signal, the fourth receiver comprising a narrow-band receiver to receive a third channel of the band of interest; and a fifth receiver to receive and downconvert a fifth RF signal to a sixth frequency signal and to output a fifth digitized signal, the fifth receiver comprising a narrow-band receiver to receive a fourth channel of the band of interest.

In an implementation, the first receiver comprises: a wide-band intermediate frequency (IF) filter and a wide-band analog-to-digital converter (ADC); and the second receiver comprises a narrow-band IF filter and a narrow-band ADC. The controller may be configured to cause the digital circuit to process the first digitized signal and combine the processed first digitized signal and the processed second digitized signal into a combined signal. The apparatus may further comprise a demodulator to demodulate the combined signal and output a demodulated signal. In an implementation, the controller may be configured to cause the digital circuit to process the first digitized signal to identify at least one blocker in proximity to the first channel. The controller may also configure at least one amplifier of the second receiver based at least in part on the at least one blocker. The controller may cause the digital circuit to process the first digitized signal to identify a plurality of programs available in the band of interest, and may cause the digital circuit to process the first digitized signal to obtain supplemental content. In an example, the first RF signal and the second RF signal are the same RF signal received from a first antenna.

In another aspect, at least one computer readable storage medium includes instructions that when executed enable a system to: configure a first receiver to receive and process a first RF signal, the first receiver comprising a full-band receiver to receive at least a substantial portion of a band of interest; configure a second receiver to receive and process a first channel of the band of interest, the second receiver comprising a narrow-band receiver, the first receiver and the second receiver adapted on a single semiconductor die; cause the first receiver to receive and process the first RF signal to output a first digitized signal and cause the second receiver to receive and process the first channel to output a second digitized signal; and output the second digitized signal from the second receiver. In a first mode of operation, the second receiver may include at least one circuit component having one or more configurable parameters controlled based at least in part on signal metric information obtained from the first digitized signal.

In an implementation, the computer readable storage medium further comprises instructions that when executed enable the system to: in a second mode of operation, process the first digitized signal and process the second digitized signal; and combine the processed first digitized signal and the processed second digitized signal, to provide a phase diversity combined signal. The computer readable storage medium may further comprise instructions that when executed enable the system to: configure the first receiver to receive the first RF signal from a first antenna and configure the second receiver to receive the first RF signal from the first antenna in the first mode of operation; and configure the first receiver to receive the first RF signal from the first antenna and configure the second receiver to receive a second RF signal from a second antenna in the second mode of operation. The computer readable storage medium may further comprise instructions that when executed enable the system to: process the first digitized signal to obtain supplemental content; and output the supplemental content via an output device of the system. In an example, the supplemental content comprises at least one of program information for one or more radio channels and traffic information.

In another aspect, a system comprises a first integrated circuit and a demodulator to receive and demodulate at least a portion of a processed first digitized signal and a processed second digitized signal to output a demodulated signal. Note that in different examples, the demodulator may be included internal to or external to the first integrated circuit.

In an implementation, the first integrated circuit includes: a full-band receiver to receive and downconvert a RF signal to a second frequency signal and to output a first digitized signal; a narrow-band receiver to receive and downconvert the RF signal to a third frequency signal and to output a second digitized signal; a digital circuit coupled to the full-band receiver and the narrow-band receiver, the digital circuit to process the first digitized signal and the second digitized signal; and a controller to configure the first receiver and the second receiver and control the digital circuit.

In an implementation, the first integrated circuit further comprises a second narrow-band receiver to receive and downconvert a second RF signal to a fourth frequency signal and to output a third digitized signal. The full-band receiver may comprise a wide-band IF filter and a wide-band ADC, and the narrow-band receiver may comprise a narrow-band IF filter and a narrow-band ADC. The controller may be configured to cause the digital circuit to combine the processed first digitized signal and the processed second digitized signal into a combined signal and output the combined signal to the demodulator. The controller may be configured to cause the digital circuit to process the first digitized signal to identify at least one blocker in proximity to a requested channel, where the narrow-band receiver is to operate at the requested channel. The controller may cause at least one amplifier of the narrow-band receiver to be configured based at least in part on the at least one blocker.

DETAILED DESCRIPTION

In various embodiments, a receiver architecture is provided that includes multiple independent receivers, namely multiple independent receive signal processing paths. These multiple receivers include one full-band capture (FBC) receiver and one to N narrow-band receivers. In different implementations, the number of narrow-band receivers may be application specific. If only one primary channel capability is desired, only one such narrow-band receiver may be provided in a particular architecture. In other cases, when multiple primary channel handling is desired, more than one (2 to N) individual narrow-band receivers are provided. As will be described herein, by providing a receiver with both FBC and narrow-band capabilities, improved performance while also reducing power consumption can be realized. Embodiments thus combine benefits from receiving an entire band with advantages of lower powered, higher dynamic range narrow-band receivers. A hybrid receiver as described herein enables performance enhancements such as phase diversity, blocker-keyed automatic gain control (AGC), and increased sensitivity from combining multiple receivers.

In embodiments, signal integrity may be improved, e.g., by configuring a receiver architecture for a phase diversity mode of operation in which desired content is received via multiple antennas and processed independently in the different signal processing paths of the FBC receiver and narrow-band receiver. After appropriate processing in the analog and digital domains, digitized signals from the two paths can be combined according to a phase diversity technique such as maximal ratio combining (MRC) to improve signal performance. Note that using phase diversity with a FBC receiver and a narrow-band receiver, reduced power consumption is realized, rather than using multiple FBC receivers for performing phase diversity techniques.

Embodiments further provide improved performance in the face of one or more strong blocking RF signals in a band of interest, by using combinations of the FBC receiver and one or more narrow-band receivers. For example, when a strong blocking signal is present in a band of interest (but outside of a particular desired channel), the narrow-band receiver output may be used (outside of a phase diversity technique, in some cases) to provide a signal source without such interference. As such, receiver sensitivity can be enhanced. In this case, a larger gain can be provided to the received RF signal in the narrow-band receiver without concern for the deleterious effects of the blocker signal, thus improving sensitivity over a FBC receiver. Sensitivity may further be enhanced by leveraging information obtained from the FBC receiver in control and configuration of the narrow-band receiver. As an example, one or more strong blockers can be identified within the band of interest (but outside of a desired channel). Based at least in part on this signal metric or blocker-keyed information as obtained from the FBC receiver, one or more components of the narrow-band receiver such as an amplifier can be controlled based on this blocker-keyed information.

Figure 1:
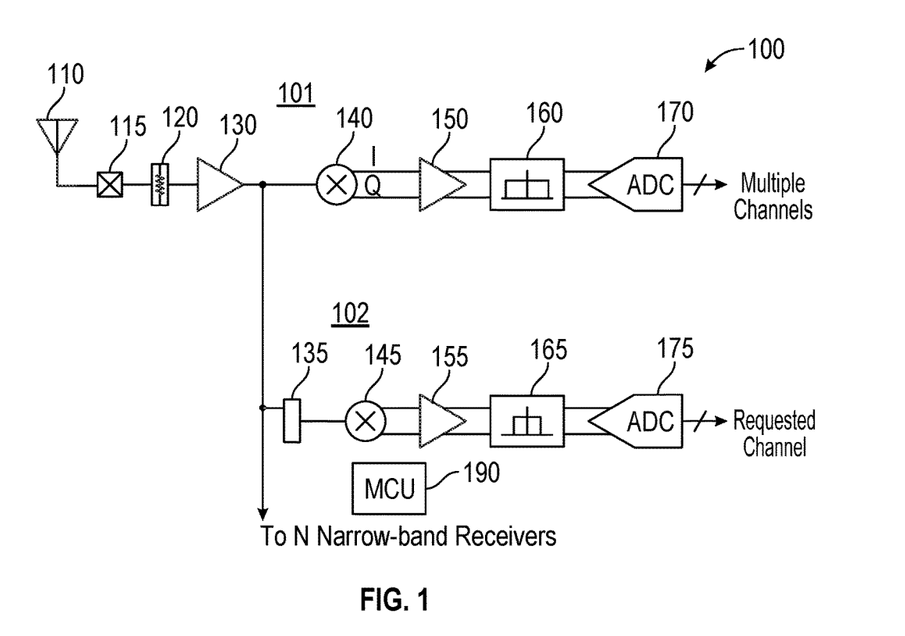
FIG. 1 is a schematic diagram of a receiver architecture in accordance with an embodiment.

Referring now to FIG. 1, shown is a schematic diagram of a receiver architecture in accordance with an embodiment. More specifically as shown in FIG. 1, receiver 100 includes multiple independent receivers. In the particular embodiment shown, a first receiver (generally shown at 101) is implemented as a full-band capture (FBC) receiver. As such, receiver 101 is configured to receive and process all or at least substantially all of a given band of interest. For example, receiver 101 may be configured as an FM receiver to receive an entire FM band (e.g., from approximately 88 megahertz (MHz)-108 MHz in the United States or similar bandwidths in other countries, such as 76 MHz-90 MHz in Japan). In other cases, receiver 101 may be configured to operate as a band III (B3) receiver. B3 has a bandwidth of approximately 75 MHz (ranging between 174 MHz and 240 MHz). In many cases, receiver 101 can be configured to receive and process this full-band. In other cases, receiver 101 may be configured to receive and process at least a substantial portion of a band of interest (e.g., at least 25 MHz or more), such that the receiver can concurrently receive and process multiple channels within a given band of interest.

As further illustrated in FIG. 1, a second receiver 102 is present. Receiver 102 is implemented as a narrow-band receiver. That is, receiver 102 is configured to receive and process a single channel of a band of interest. For example for FM band, receiver 102 is configured to receive and process a bandwidth of approximately 200 kilohertz (kHz) associated with a requested channel, such as responsive to a user request for reception of a given radio channel.

Understand that for ease of illustration only a single narrow-band receiver 102 is shown. In different embodiments, a plurality of narrow-band receivers may be present in a given implementation. Using multiple narrow-band receivers enables reception of multiple channels simultaneously via these different narrow-band receivers, as may be used for providing alternate content, phase diversity capability and so forth.

Still with reference to FIG. 1, architecture 100 includes an antenna 110 to receive an RF signal. As illustrated, antenna 110 couples via an input pad 115 of a given semiconductor die as implemented in an integrated circuit (IC) to a front end RF attenuator 120. In various embodiments, attenuator 120 may be controllable, e.g., based on signal metric information. Attenuator 120 in turn is coupled to an amplifier 130, which in an embodiment may be a low noise amplifier (LNA). As seen, the amplified output from LNA 130 is provided to the alternate parallel signal processing paths of receivers 101 and 102. First with reference to receiver 101, the incoming amplified RF signal is provided to a mixer 140. In various embodiments, mixer 140 may be implemented as a complex mixer to downconvert the incoming RF signal to a second frequency signal, such as a given intermediate frequency (IF) signal.

Still with reference to FIG. 1, the downconverted complex output of mixer 140 is provided to an amplifier 150. In various embodiments, amplifier 150 may be implemented as a programmable gain amplifier (PGA) and/or variable gain amplifier (VGA). As will be described herein, in some cases amplifier 150 may be controlled according to automatic gain control (AGC) circuitry, such as may be present in a microcontroller (MCU) 190, which may be an on-chip controller or other hardware logic circuitry to perform configuration and control operations with respect to architecture 100.

After signal level adjustment in amplifier 150, the resulting amplified signal is provided to a filter 160. In various embodiments, filter 160 may be implemented as a wide-band IF filter. In one embodiment, the wide-band IF filter may be implemented as a bandpass filter. The bandwidth of filter 160 may be configured to be at least as large as the band of interest or the portion of the band that the receiver is capable of processing. Filter 160 may be implemented as a complex filter or a real filter, in different embodiments. The filter output in turn is provided to an analog-to-digital converter (ADC) 170, which in embodiments may be implemented as a wide-band ADC such as a sigma-delta ADC. At this point, the ADC output is a digitized signal, e.g., a 3-bit signal, that includes content of the full-band of interest.

From here, the digitized signal can be provided to downstream circuitry for further processing. As examples, this circuitry may be implemented on the same semiconductor die (or a different die within a given multi-chip IC) or on another IC. This downstream circuitry includes digital circuitry such as a digital signal processor (DSP) to perform further processing on the digitized signal, including circuitry for digital downconversion, signal processing, channel selection, and so forth. Either within this same digital circuit or within a separate demodulator, the processed digitized signal can be demodulated to output a demodulated signal, which may then be provided, e.g., to an audio processor to receive the demodulated signal and output an audio stream. As will be described herein, particularly for this FBC receiver, the digitized signal, in addition to or alternately from demodulation, may be processed instead to obtain various information, such as signal metric information, channel scan information, blocker signal information, supplemental content information, among other such information.

As further illustrated in FIG. 1, MCU 190 may be implemented on chip and may include non-transitory stored program instructions for execution by MCU 190 to perform various configuration and control operations as described herein. In some cases, MCU 190 in turn may be coupled to a host processor of a given entertainment system, such as a vehicle entertainment system in which receiver 100 is adapted. As such, e.g., based on user requests for particular channels, content or other information, the host processor may provide control signals to MCU 190, to cause it to configure appropriate portions of one or more of receivers 101 and 102 (and downstream circuitry, in some cases).

With regard to narrow-band receiver 102, its signal processing path includes a selection circuit 135 which in an embodiment may be implemented as a multiplexer (e.g., controlled by MCU 190). Understand that control of selection circuit 135 may be fixed on implementation of a receiver in a particular entertainment system. For example, in the embodiment of FIG. 1, with a single antenna source 110, a permanent and fixed configuration may be implemented to control selection circuit 135 to provide a first input (output from LNA 130) to the signal processing path of receiver 102, and more particularly to mixer 145. In various embodiments, mixer 145 may be implemented as a complex mixer to downconvert the incoming RF signal to a second frequency signal, such as a given IF signal. Understand while embodiments described herein are in connection with an IF receiver architecture, other implementations may configure a receiver as a low-IF or zero-IF (ZIF) receiver.

In other cases, understand that a given receiver may be coupled to multiple antennas, and depending upon system configuration and/or mode of operation, selection circuit 135 may be dynamically controlled to provide a given one of two or more input RF signals to the signal processing path of narrow-band receiver 102. The output of selection circuit 135 may also connect to an LNA with variable gain before the connection to mixer 145. This amplifier could improve sensitivity in blocker-keyed AGC scenarios.

FBC receiver 101 offers the advantage of receiving the entire band. However, this comes at the cost of a wider bandwidth for the IF stage (including components 150, 160, and 170). The wider bandwidth stage will consume more power and cannot filter large, in-band blockers. Narrow-band receiver 102 offers an advantage over FBC receiver 101 for these two issues. Narrow-band receiver 102 can filter out large, in-band blockers, allowing the receiver to use more gain, thus providing a more sensitive receiver.

In the implementation shown in FIG. 1, all circuitry other than antenna 110 may be configured on a single semiconductor die as implemented in one IC. In other cases, understand that the circuitry may be split between multiple die, either within a single IC or as part of separate ICs. Still further, understand that additional circuitry not shown in FIG. 1 may be present in particular implementations. For example as discussed above in some cases downstream digital circuitry may also be present on the same semiconductor die. In other cases, one or more other ICs may be coupled to an IC including architecture 100.

Figure 2:
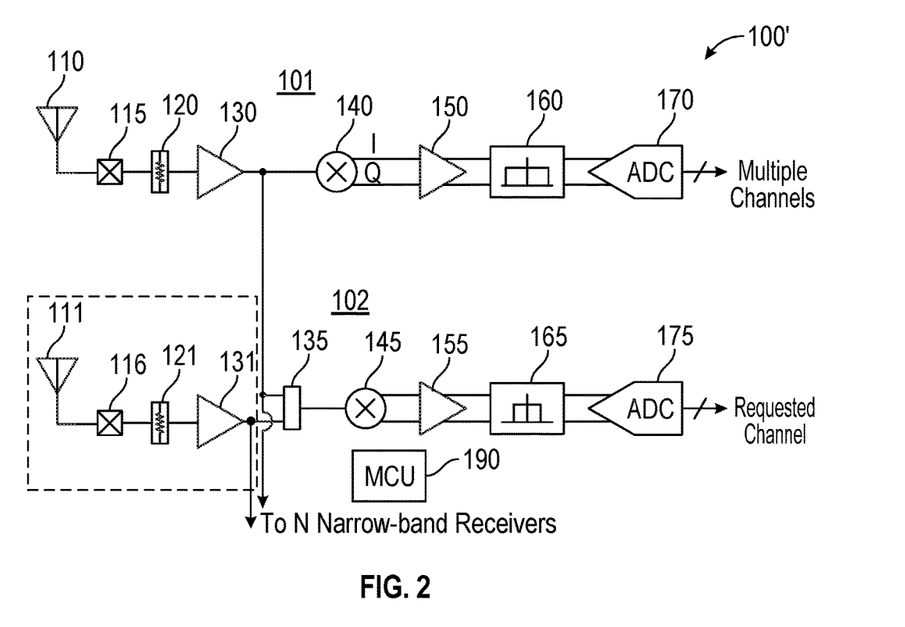
FIG. 2 is a schematic diagram of an architecture in accordance with another embodiment.

In other cases, multiple antennas may be provided in a given entertainment system, as discussed above. Referring now to FIG. 2, shown is a schematic diagram of an architecture in accordance with another embodiment. More specifically as shown in FIG. 2, receiver architecture 100' may be configured similarly to that of FIG. 1, in that a FBC receiver and at least one narrow-band receiver are provided. In addition, note the presence of an additional antenna 111, also configured to receive an RF signal and provide it to architecture 100. More specifically, the received RF signal from antenna 111 may couple through an input pad 116 and through RF attenuator 121 to an amplifier 131, which may be implemented as an LNA. The amplified output of LNA 131 couples as a second input to selection circuit 135. Thus in the embodiment of FIG. 2, based on control, e.g., by MCU 190, FBC receiver 101 is configured to receive an RF signal from antenna 110 while in turn narrow-band receiver 102 is configured to receive an RF signal from antenna 111. Note that in different embodiments these RF signals may have somewhat different signal characteristics, such as phase and path delays, as they are obtained from different antennas. In this way, the architecture can perform in a phase diversity mode of operation in which the resulting digitized signals of the two different signal processing paths (received from two different antennas) can be combined downstream according to a given phase diversity technique to enable improved signal reception, to avoid signal degradation due to multipath fading and so forth, particularly in implementations such as an automotive entertainment system. Understand while the embodiment of FIG. 2 is shown with two antennas each providing an independent RF signal (which in embodiments may be configured to receive the same RF content), in other cases additional antennas may be provided where multiple narrow-band receivers are present. Or other narrow-band receivers may receive the same RF signal from one of the available two antennas shown in FIG. 2.

Figure 3:
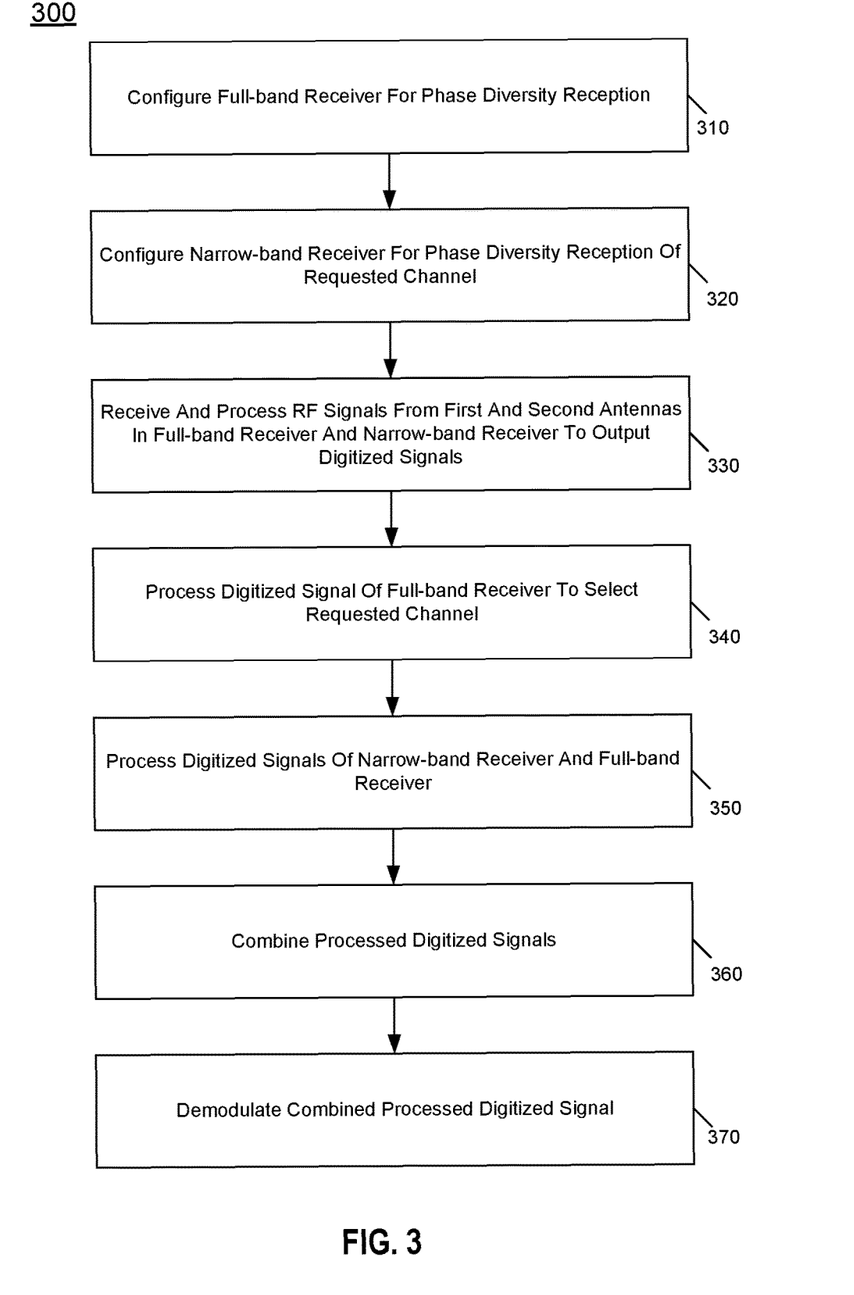
FIG. 3 is a flow diagram of a method in accordance with an embodiment.

Referring now to FIG. 3, shown is a flow diagram of a method in accordance with an embodiment. More specifically, method 300 of FIG. 3 may be performed by a microcontroller unit (MCU) of a receiver having an architecture as described herein. In different embodiments, this MCU may be configured as a standalone control unit or may be implemented as all or part of a microcontroller or other programmable hardware control logic. As such, in different embodiments, method 300 may be performed by combinations of hardware, software and/or firmware. In some embodiments, method 300 may be implemented using program instructions stored in a non-transitory medium such as a non-volatile storage associated with an MCU, a firmware storage or so forth.

As illustrated, method 300 is a method for configuring and controlling a receiver architecture to operate in a phase diversity mode in which RF inputs from multiple antennas are received and processed. Method 300 begins by configuring a full-band receiver for a phase diversity reception (block 310). Such configuring may be implemented by controlling configuration parameters of various circuits of the receiver processing path, including gain control circuitry, filtering circuitry, mixing circuitry and so forth. For phase diversity reception mode, this FBC receiver may be configured to couple to a first antenna. Understand that the configuring shown at block 310 may be a one-time configuration of a receiver, e.g., upon startup. In other cases, the phase diversity mode may be dynamically controlled, e.g., based on environmental conditions, signal integrity information, or so forth.

Still with reference to FIG. 3, control passes to block 320 where a narrow-band receiver also may be configured for phase diversity reception. More specifically, this narrow-band receiver may be configured to receive a requested channel including appropriate control of a mixer to tune to the requested channel. This requested channel may correspond to a user request for a desired radio station. Of course the receiver may be configured with other configuration parameters including control parameters for various gain control circuitry, filtering circuitry and so forth. Note that this configuration of the narrow-band receiver also includes controlling the narrow-band receiver to receive an RF signal from a different antenna than the first antenna that couples to the FBC receiver. To this end, a selection circuit such as a multiplexer may be appropriately controlled to receive and pass an RF input to the signal processing path of the narrow-band receiver from a second antenna.

Still referring to FIG. 3, next control passes to block 330, where the two receivers may operate to receive and process incoming RF signals from the respective antennas, to thus output digitized signals. More specifically, each receiver may receive and process the incoming signals (such as by way of amplification and filtering, downconversion and digitization) to output digitized signals. Next with respect to the digitized IF signal from the FBC receiver, a channel selection process may be performed to select the requested channel. In an embodiment, downstream digital circuitry may perform appropriate filtering to extract the selected requested channel (block 340).

Thereafter the resulting digitized IF signals of the narrow-band receiver and this selected channel of the digitized IF signal from the FBC receiver may be further processed (block 350). For example, various signal processing may be performed in a DSP or other digital processor. Next at block 360 these processed digitized IF signals may be optimally combined, for purposes of phase diversity. In an embodiment, an MRC combination of these signals may be performed such that a better quality received signal is weighted more heavily in the combination. Finally control passes to block 370, where this combined processed digitized signal may be demodulated. Note that this demodulation process may be performed in a demodulator adapted on the same semiconductor die or within the same IC as the multiple receivers and digital processor. In other cases, a separate downstream demodulator may be used. Understand that additional processing steps may be performed. For example, the demodulated signal may be provided to an audio processor to perform further audio processing on the demodulated signal to output an audio signal, e.g., to multiple channels of speakers, e.g., of an automotive entertainment system. Understand while shown at this high level in FIG. 3, many variations and alternatives are possible.

Figure 4:
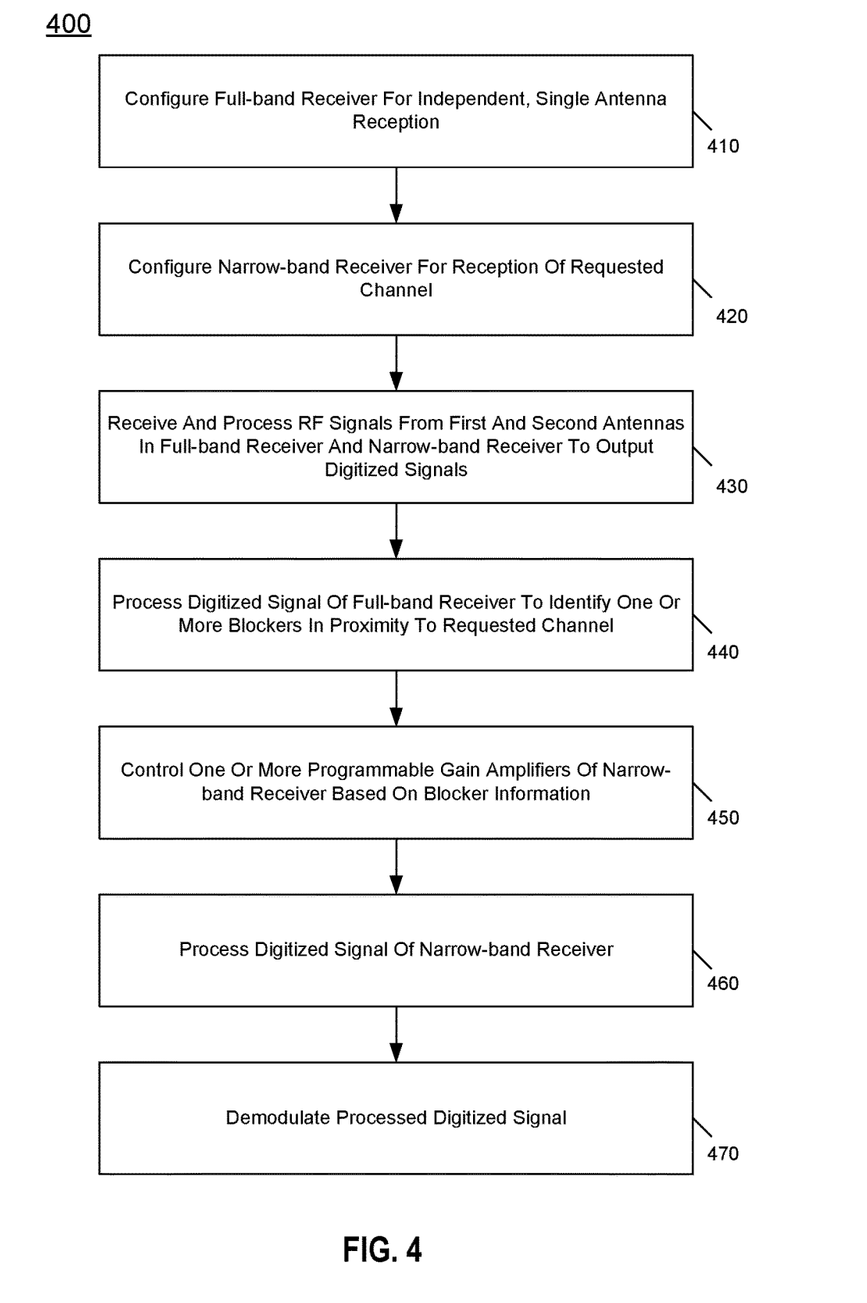
FIG. 4 is a flow diagram of a further method in accordance with an embodiment.

Referring now to FIG. 4, shown is a flow diagram of a further method in accordance with an embodiment, which may also be performed by a MCU of a receiver having an architecture as described herein. As such, in different embodiments, method 400 may be performed by combinations of hardware, software and/or firmware, including but not limited to executing program instructions stored in a non-transitory medium such as a non-volatile storage associated with an MCU, a firmware storage or so forth.

As illustrated, method 400 is a method for configuring and controlling a receiver architecture to operate in a single antenna reception mode in which an RF input from a single antenna is received and processed. Method 400 begins by configuring a full-band receiver for this independent, single antenna reception mode (block 410). Such configuring may be implemented by controlling configuration parameters of various circuits of the receiver processing path, including gain control circuitry, filtering circuitry, mixing circuitry and so forth as discussed above.

Still with reference to FIG. 4, control passes to block 420 where a narrow-band receiver also may be configured for this single antenna reception mode to receive a requested channel including appropriate control of a mixer to tune to the requested channel. To this end, a selection circuit may be appropriately controlled to receive and pass an RF input to the signal processing path of the narrow-band receiver from the same antenna that couples to the full-band receiver.

Still referring to FIG. 4, next control passes to block 430, where the two receivers may operate to receive and process incoming RF signals from the respective antennas, to thus output digitized signals. Next with respect to the digitized signal from the FBC receiver, the resulting digitized signal can be processed to identify one or more blocker signals in proximity to the requested channel (block 440). Such blocker signals may result from close interfering signals or other very strong signals, and can be identified using signal metric information, e.g., as determined based on the digitized signal.

At block 450, based on this blocker information, the narrow-band receiver may be appropriately controlled. More specifically, based at least in part on this information, one or more programmable gain amplifiers of the narrow-band receiver may be appropriately controlled. This blocker information may be provided to indicate a given signal level (e.g., as a power reading or signal-to-noise (SNR) level or so forth), along with a location of the blocker signal. Then, based upon this information the MCU may access a table stored in a storage. This table can include multiple entries, each associated with a given blocker signal to identify gain control settings, e.g., for one or more programmable gain amplifiers. Understand that in some embodiments such entries may include additional information, such as configuration information for one or more filters or other signal processing circuitry, to improve reception in the face of such interfering signal. And of course, other arrangements or manners of determining configuration parameters based on blocking information can occur in other embodiments.

Thereafter the resulting digitized signals of the narrow-band receiver may be further processed (block 460). For example, various signal processing may be performed in a DSP or other digital processor. Finally control passes to block 470, where this processed digitized signal may be demodulated such as described above. Understand that additional processing steps may be performed. For example, the demodulated signal may be provided to an audio processor to perform further audio processing on the demodulated signal to output an audio signal, e.g., to multiple channels of speakers, e.g., of an automotive entertainment system. Understand while shown at this high level in FIG. 4, many variations and alternatives are possible.

As described above, in some cases information obtained from the FBC receiver may be used for providing supplemental content. Such supplemental content can include radio data system (RDS)-based information such as program metadata or other such information. Still other examples include RDS-traffic message channel (TMS) information, including, e.g., traffic reporting information.

Figure 5:
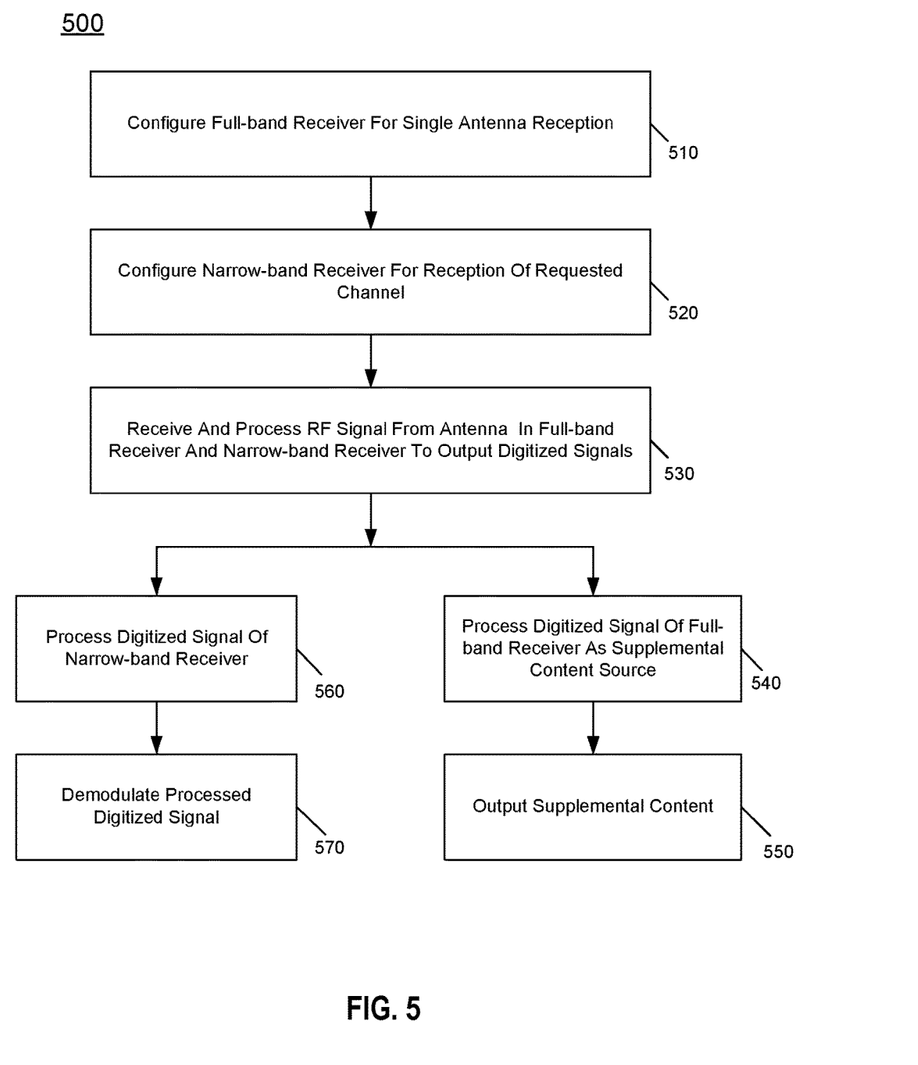
FIG. 5 is a flow diagram of a method in accordance with yet another embodiment.

Referring now to FIG. 5, shown is a flow diagram of a method in accordance with yet another embodiment. In FIG. 5, method 500 provides for configuring and controlling a receiver architecture as described herein to enable concurrent reception and output of a requested channel along with receipt, processing and output of supplemental content, as appropriate for a given entertainment system. As shown, method 500 begins by configuring the full-band receiver for single antenna reception (block 510) and configuring the narrow-band receiver for reception of a requested channel (block 520), similar as to operations described above. Thereafter at block 530 the RF signal received via the antenna is processed in the full-band receiver and narrow-band receiver to output digitized signals.

At this point, these digitized signals can be processed in digital processing circuitry in parallel to output a demodulated signal of the requested channel as well as to output given supplemental content. Thus with further reference to FIG. 5, various processing may be performed on the digitized signal from the full-band receiver to obtain supplemental content (block 540). That is, the FBC receiver may, for some or all of its band of interest, provide supplemental content such as program identifiers or other content metadata, traffic information or so forth. This information may be processed within a DSP to extract the supplemental content, such that such supplemental content can be output at block 550. As examples, the supplemental content can be used to populate a display of available channels and program content, e.g., on a display of the entertainment system. In other cases, such as where the supplemental content includes traffic information, a map display, or text output may occur.

Understand that in parallel with such supplemental content handling, a desired radio channel may be provided by way of the digitized signal obtained from the narrow-band receiver. Thus as shown in FIG. 5, at block 560 the digitized signal can be processed, such as described above. Thereafter the processed digitized signal can be demodulated (block 570). Of course additional operations to output the audio stream, such as may be performed by an audio processor also may occur. Understand while shown at this high level in FIG. 5, many variations and alternatives are possible.

Figure 6:
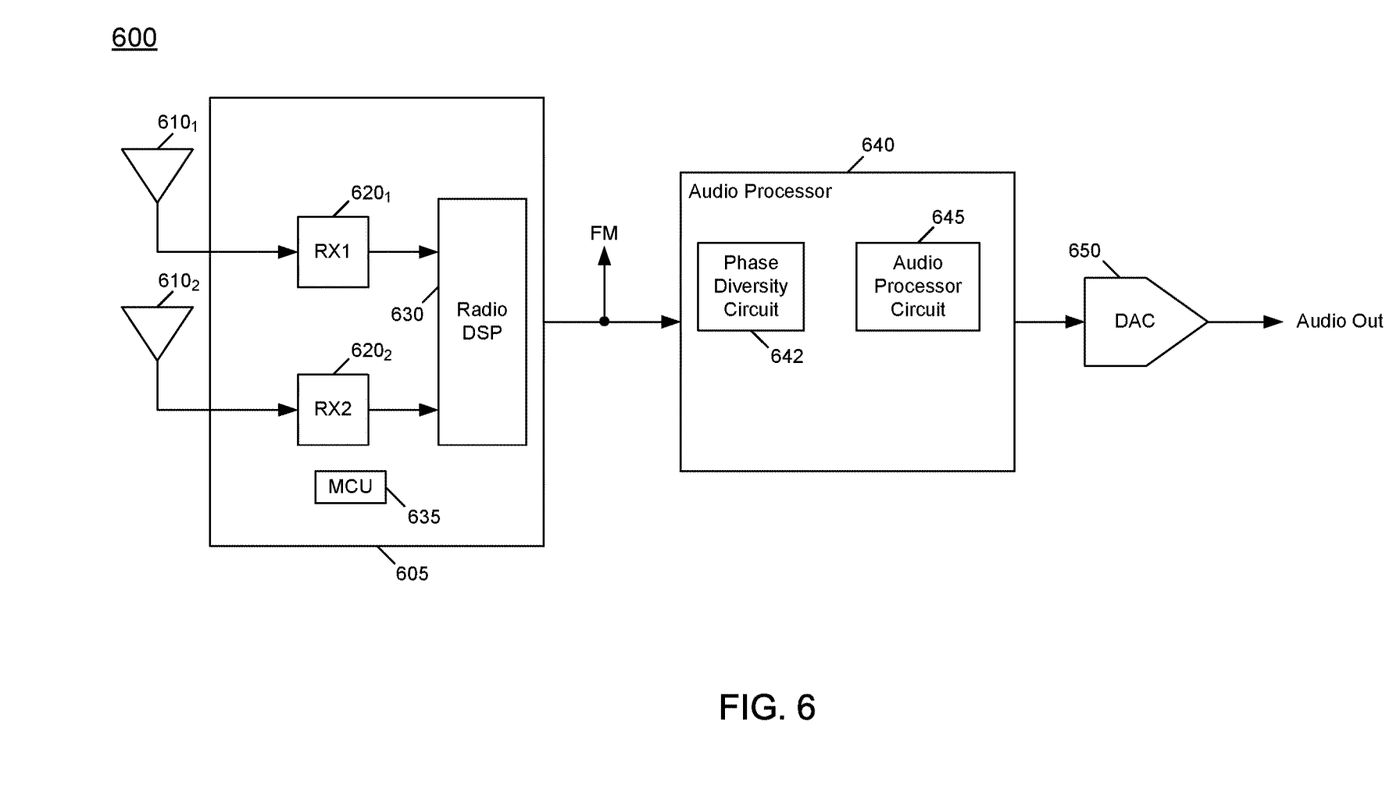
FIG. 6 is a block diagram of an entertainment system in accordance with an embodiment.

Referring now to FIG. 6, shown is a block diagram of an entertainment system in accordance with an embodiment. In the embodiment illustrated in FIG. 6, entertainment system 600 is implemented as a vehicle entertainment system, which may correspond to an in-dash system of a given vehicle or may be implemented instead as an after-market entertainment system.

In any case, system 600 includes multiple antennas $610_1$, $610_2$, to receive RF signals independently. In some cases these antennas may be configured for different bands. In other cases, antennas 610 may be configured for the same band to perform phase diversity such as described herein. As illustrated, the received RF signals from antennas 610 are provided to a tuner 605. In an embodiment, tuner 605 may be implemented as one or more ICs. As illustrated, tuner 605 includes multiple receivers $620_1$, $620_2$. In accordance with the teachings herein, receiver $620_1$ may be configured as an FBC receiver, while receiver $620_2$ may be configured as a narrow-band receiver. Understand that in other embodiments, additional narrow-band receivers may be present.

After the incoming RF signals are processed in receivers 620, digitized signals may be provided to a DSP 630 for performing various digital signal processing, including digital downconversion, filtering, image rejection, and further decimation, along with phase diversity combining of digitized IF signals in some cases. In addition, with regard to information obtained from FBC receiver $620_1$, additional processing also may occur, e.g., to determine signal metric information, program information, supplemental content or so forth. In embodiments, DSP 630 may further include a demodulator to demodulate the digitally processed signal to thus output a demodulated signal. The different modes and configuration of receivers 620 and DSP 630 is via MCU 635 configured to execute firmware or other instructions stored on a non-transitory storage medium.

In the embodiment shown in FIG. 6, this demodulated signal is provided to an audio processor 640. Note that in some cases, tuner 605 may directly output demodulated signals, e.g., of an FM band as a separate output not provided to audio processor 640. Audio processor 640 may include an audio processor circuit 645 to perform audio processing. Understand that in other cases, in a phase diversity mode, modulated signals independently obtained from multiple receivers 620 may be provided to audio processor 640. In such cases, audio processor 640 includes a phase diversity circuit 642 to combine the signals and then demodulate this combined signal.

Audio processor 640 thus may perform audio processing as desired to output a stream to a digital-to-analog converter (DAC) 650, such that an audio output is provided. Of course understand that in a given entertainment system, additional components may be provided to perform receipt and processing of other types of signals. Also understand that a host processor of entertainment system 600 (not shown for ease of illustration) may send control signals to tuner 605 (for handling by MCU 630) to control mode of operation and configuration of the receivers and other circuitry as described herein.

Understand that the various operations described above to configure and operate parallel receivers and digital circuitry as described herein may be realized using instructions stored in a non-transitory storage medium that when executed enable a microcontroller or other control logic to perform such configuration and control. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first receiver to receive and downconvert a first radio frequency (RF) signal to a second frequency signal and to output a first digitized signal, the first receiver comprising a full-band receiver to receive at least a substantial portion of a band of interest;
    a second receiver to receive and downconvert a second RF signal to a third frequency signal and to output a second digitized signal, the second receiver comprising a narrow-band receiver to receive a first channel of the band of interest;
    a digital circuit coupled to the first receiver and the second receiver, the digital circuit to process at least the second digitized signal; and
    a controller to configure the first receiver and the second receiver and control the digital circuit, wherein the controller is to cause the digital circuit to process the first digitized signal to identify a plurality of programs available in the band of interest.

2. The apparatus of claim 1, further comprising a third receiver to receive and downconvert a third RF signal to a fourth frequency signal and to output a third digitized signal, the third receiver comprising a narrow-band receiver to receive a second channel of the band of interest.

3. The apparatus of claim 2, further comprising:
    a fourth receiver to receive and downconvert a fourth RF signal to a fifth frequency signal and to output a fourth digitized signal, the fourth receiver comprising a narrow-band receiver to receive a third channel of the band of interest; and
    a fifth receiver to receive and downconvert a fifth RF signal to a sixth frequency signal and to output a fifth digitized signal, the fifth receiver comprising a narrow-band receiver to receive a fourth channel of the band of interest.

4. The apparatus of claim 1, wherein the first receiver comprises:
    a wide-band intermediate frequency (IF) filter and a wide-band analog-to-digital converter (ADC); and
    the second receiver comprises a narrow-band IF filter and a narrow-band ADC.

5. The apparatus of claim 1, wherein the controller is to cause the digital circuit to process the first digitized signal and the second digitized signal and combine the processed first digitized signal and the processed second digitized signal into a combined signal.

6. The apparatus of claim 5, further comprising a demodulator to demodulate the combined signal and output a demodulated signal.

7. The apparatus of claim 1, wherein the controller is to cause the digital circuit to process the first digitized signal to identify at least one blocker in proximity to the first channel.

8. The apparatus of claim 7, wherein the controller is to configure at least one amplifier of the second receiver based at least in part on the at least one blocker.

9. The apparatus of claim 1, wherein the controller is to cause the digital circuit to process the first digitized signal to obtain supplemental content.

10. The apparatus of claim 1, wherein the first RF signal and the second RF signal are the same RF signal received from a first antenna.

11. At least one non transitory computer readable medium comprising instructions that when executed, by a controller, enable the controller to:
    configure a first receiver to receive and process a first radio frequency (RF) signal, the first receiver comprising a full-band receiver to receive at least a substantial portion of a band of interest;
    configure a second receiver to receive and process a first channel of the band of interest, the second receiver comprising a narrow-band receiver, the first receiver and the second receiver adapted on a single semiconductor die;
    cause the first receiver to receive and process the first RF signal to output a first digitized signal and cause the second receiver to receive and process the first channel to output a second digitized signal; and
    output the second digitized signal from the second receiver, wherein in a first mode of operation, the second receiver includes at least one circuit component having one or more configurable parameters controlled based at least in part on signal metric information obtained from the first digitized signal.

12. The at least one non-transitory computer readable storage medium of claim 11, further comprising instructions that when executed, by the controller, enable the controller to:
    in a second mode of operation, process the first digitized signal and process the second digitized signal; and
    combine the processed first digitized signal and the processed second digitized signal, to provide a phase diversity combined signal.

13. The at least one non-transitory computer readable storage medium of claim 12, further comprising instructions that when executed, by the processor of the controller, enable the controller to:
    configure the first receiver to receive the first RF signal from a first antenna and configure the second receiver to receive the first RF signal from the first antenna in the first mode of operation; and
    configure the first receiver to receive the first RF signal from the first antenna and configure the second receiver to receive a second RF signal from a second antenna in the second mode of operation.

14. The at least one non-transitory computer readable storage medium of claim 11, further comprising instructions that when executed, by the controller, enable the controller to:
    process the first digitized signal to obtain supplemental content; and output the supplemental content via an output device, wherein the supplemental content comprises at least one of program information for one or more radio channels and traffic information.

15. A system comprising:
a first integrated circuit including:
- a full-band receiver to receive and downconvert a radio frequency (RF) signal to a second frequency signal and to output a first digitized signal;
- a narrow-band receiver to receive and downconvert the RF signal to a third frequency signal and to output a second digitized signal;
- a digital circuit coupled to the full-band receiver and the narrow-band receiver, the digital circuit to process the first digitized signal and the second digitized signal; and
- a controller to configure the full-band receiver and the narrow-band receiver and control the digital circuit; and a demodulator to receive and demodulate at least a portion of the processed first digitized signal and the processed second digitized signal to output a demodulated signal.

16. The system of claim 15, wherein the first integrated circuit further comprises a second narrow-band receiver to receive and downconvert a second RF signal to a fourth frequency signal and to output a third digitized signal.

17. The system of claim 15, wherein the full-band receiver comprises a wide-band intermediate frequency (IF) filter and a wide-band analog-to-digital converter (ADC), and the narrow-band receiver comprises a narrow-band IF filter and a narrow-band ADC.

18. The system of claim 15, wherein the controller is to cause the digital circuit to combine the processed first digitized signal and the processed second digitized signal into a combined signal and output the combined signal to the demodulator.

19. The system of claim 15, wherein the controller is to cause the digital circuit to process the first digitized signal to identify at least one blocker in proximity to a requested channel, wherein the narrow-band receiver is to operate at the requested channel.

20. The system of claim 19, wherein the controller is to configure at least one amplifier of the narrow-band receiver based at least in part on the at least one blocker.

* * * * *